(12) United States Patent
Mohr et al.

(10) Patent No.: US 8,215,197 B2
(45) Date of Patent: Jul. 10, 2012

(54) DEVICE FOR ACTUATING A GEARWHEEL, WHICH IS DESIGNED AS A LOOSE WHEEL, OF A TRANSMISSION DEVICE

(75) Inventors: Mark Mohr, Tettnang (DE); Matthias Reisch, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 529 days.

(21) Appl. No.: 12/445,529

(22) PCT Filed: Oct. 11, 2007

(86) PCT No.: PCT/EP2007/060818
§ 371 (c)(1),
(2), (4) Date: Apr. 14, 2009

(87) PCT Pub. No.: WO2008/046776
PCT Pub. Date: Apr. 24, 2008

(65) Prior Publication Data
US 2009/0301248 A1    Dec. 10, 2009

(30) Foreign Application Priority Data
Oct. 19, 2006 (DE) .......................... 10 2006 049 281

(51) Int. Cl.
*F16H 3/14* (2006.01)
*F16H 3/08* (2006.01)
(52) U.S. Cl. .......................................... 74/355; 74/372
(58) Field of Classification Search ............. 74/355–379
See application file for complete search history.

(56) References Cited

U.S. PATENT DOCUMENTS

| 1,731,076 | A |   | 10/1929 | Maurer |  |
|-----------|---|---|---------|--------|--|
| 1,744,564 | A | * | 1/1930  | McGill | 74/336.5 |
| 2,763,350 | A | * | 9/1956  | Klaue  | 192/3.62 |
| 3,253,475 | A | * | 5/1966  | Papst  | 74/364 |
| 3,335,622 | A | * | 8/1967  | Muller et al. | 74/661 |
| 3,838,759 | A | * | 10/1974 | Schmoelz et al. | 192/48.91 |
| 5,992,254 | A | * | 11/1999 | Machado | 74/335 |
| 7,882,758 | B2 | * | 2/2011 | Kubo et al. | 74/372 |

FOREIGN PATENT DOCUMENTS

| DE | 3711490 A1     | 10/1987 |
| DE | 4325964 A1     | 1/1995  |
| DE | 199 21 064 A1  | 11/2000 |
| DE | 100 23 107 A1  | 11/2001 |
| DE | 102 06 584 A1  | 9/2003  |
| DE | 102 25 331 A1  | 12/2003 |
| FR | 28 61 450 A1   | 4/2005  |

OTHER PUBLICATIONS

Machine translation of DE 3711490 Sep. 26, 2011.*

* cited by examiner

*Primary Examiner* — Tisha Lewis
(74) *Attorney, Agent, or Firm* — Davis & Bujold, P.L.L.C.

(57) ABSTRACT

A device for actuating a gearwheel of a transmission device. The gearwheel rotates on a shaft and can be shifted by way an engagement mechanism that includes at least one actuator that is arranged at least partially inside the shaft. The actuator can be actuated by a pressure medium to fix the gearwheel to the shaft. The actuation force required for engaging or disengaging the gearwheel can come from within the shaft. The actuator is a piston-cylinder unit which is either rotationally fixed to the shaft or rotationally fixed relative the shaft. When the actuator is rotationally fixed relative to the shaft, the active connection between the actuator and the gearwheel, which is to be shifted, includes a drive decoupling unit between the actuator and the shaft.

16 Claims, 4 Drawing Sheets

DEVICE FOR ACTUATING A GEARWHEEL, WHICH IS DESIGNED AS A LOOSE WHEEL, OF A TRANSMISSION DEVICE

This application is a National stage completion of PCT/EP2007/060818 filed Oct. 11, 2007, which claims priority from German patent application serial no. 10 2006 049 281.1 filed Oct. 19, 2006.

FIELD OF THE INVENTION

The invention concerns a device for actuating a gearwheel designed as a loose wheel of a transmission device.

BACKGROUND OF THE INVENTION

Step-down transmissions known from practice, such as dual clutch transmissions, automated manual transmission, manual transmissions or suchlike, are usually made with gearwheels mounted to rotate on a shaft, which engage with other gearwheels connected in a rotationally fixed manner on another shaft, thereby forming so-termed paired gearwheels. By alternate rotationally fixed connection of the gearwheels mounted to rotate on the shaft, the gearwheel pairs can be engaged in the force flow of a step-down transmission by means of appropriate shift elements such as synchronizers, claws, clutches or frictional elements, to produce the various gears of the step-down transmission.

In relation to the shaft on which the gearwheels are mounted to rotate, or loose wheels of a step-down transmission are arranged, the shift elements provided for engaging the gearwheel pairs are actuated mechanically, hydraulically, pneumatically or magnetically from the outside or from inside.

From DE 43 25 964 A1 it is known, in the case of gearwheels that rotate on a shaft, to connect them in a rotationally fixed manner to the shaft by means of a hydraulically actuated shift sleeve. For this, the shift sleeve is supplied with pressure medium that passes through the transmission shaft by hydraulic conduits.

The hydraulic actuation of the shift sleeve provided for fixing the gearwheels made as loose wheels requires, in the axial extension of the shaft, structural space between gearwheels arranged on the shaft and to be actuated, and because of this the reduction of the need for structural space, attempted by actuating from the inside of a transmission shaft outward, is not achieved to the desired extent.

In addition, a piston space associated with the shift sleeve is disadvantageously sealed relative to its surroundings by so-termed contact sealing devices, so that during the movement of the piston relative to the cylinder undesirably large friction forces are produced because of the sometimes high actuation pressures. In turn these friction forces lead to an increase of the actuation forces that have to be applied to actuate the piston. Moreover, the sealing action of a contact seal deteriorates with increasing operating time because of friction, and in some circumstances this compromises the functionality of such control means. In addition, further friction losses occur in the area of lubrication oil inlets provided between a housing and the transmission shaft, for the reasons already stated these are undesired.

From DE 102 06 584 A1 hydraulically actuated shift elements are known by means of which gearwheels mounted to rotate on a shaft can be connected in a rotationally fixed manner to the shaft. The shift elements are actuated by two hydraulic actors located inside the shaft and connected in a rotationally fixed manner to it, both of these actors being supplied with oil by a non-rotating oil supply unit.

Disadvantageously, it is very elaborate and expensive to seal and mount such an oil supply unit relative to its surroundings, and the oil supply unit must be arranged coaxially with respect to the shaft. If several actors are arranged in the shaft and are to be hydraulically actuated, then a complex oil supply and outlet system has to be provided.

Another design, known from DE 102 06 584 A1, comprises two actuators which, when a transmission is operating, have a connection rod that rotates together with the shaft, whose rotation speed is decoupled relative to a non-rotating housing. To actuate the gearwheels, made as loose wheels, both electromagnetic and hydraulic actuators are proposed, such that in each case one shift element is connected by a connection rod to one actor and rotates with the speed of the shaft, whereas a cylinder housing of a piston-cylinder unit is static relative to the shaft and the connection rod.

Owing to the high relative rotational speeds that occur during the operation of a transmission device, between a piston connected to the connection rod and the cylinder housing, either complex and costly sealing of the piston space delimited by the piston and the cylinder housing is necessary, this being affected by friction and wear, or the piston space will be characterized by substantial amounts of leakage that cause large pressure and oil losses.

From DE 102 25 331 A1 a change-under-load transmission with central synchronization is known, in which loose wheels on a transmission shaft can be actuated by a hydraulic actuator actuated hydraulically and arranged at least partially inside the transmission shaft. In the case of this actuator, a connection rod coupled to a piston is connected in a rotationally fixed manner to the shaft, whereas a cylinder housing of the actuator, made as a piston-cylinder unit, is fixed to the housing.

The disadvantage here, however, is that the drive decoupling between the connection rod and the cylinder housing is achieved by a corresponding connection between a piston and the connection rod, for example a slide or roller bearing, and the seal between the piston spaces separated from one another by the piston, which is necessary for proper functionality, is achieved only with considerable cost and complexity.

Thus, the purpose of the present invention is to make available a device for actuating a gearwheel made as a loose wheel of a transmission device, which is characterized by little demand for structural space and whose functionality is ensured with low sealing cost and complexity along with low frictional forces.

SUMMARY OF THE INVENTION

In the device according to the invention for actuating a gearwheel of a transmission device made as a loose wheel, the gearwheel being mounted to rotate on a shaft and being able to be actuated, by means of an engaging device which comprises an actuator operated by a fluidic pressure medium and which is arranged at least partially inside the shaft, to an engaged condition in which the gearwheel is connected in a rotationally fixed manner to the shaft and such that the gearwheel can be acted upon from inside the shaft outward by the actuation force required for its engagement or disengagement, the at least one actuator is made as a piston-cylinder unit arranged completely inside the shaft and connected in a rotationally fixed manner to it.

A device made with an actuator of such type is of compact and lightweight structure, and compared with designs known from the prior art for connecting gearwheels in a rotationally fixed manner to a shaft of a transmission device, it is characterized by little demand for structural space because the actuator is accommodated completely inside the shaft.

In addition, compared with the known systems the cost and complexity of sealing is reduced with the device according to the invention, since the entire piston-cylinder unit is connected rotationally fixed to the shaft carrying the loose wheel, and there is no need for drive decoupling means in the area of an active connection between the actuator and preferably a shift element that actuates the loose wheel, which is usually also connected in a rotationally fixed manner to the shaft. Accordingly, piston spaces of the piston-cylinder unit that are to be acted upon by pressure medium involve no relative rotary movements between a cylinder and a piston which delimit the piston spaces of the piston-cylinder unit, and sealing is only necessary in relation to translational relative movements between the cylinder and the piston.

In the device the at least one actuator is made as a pneumatic or hydraulic motor, which is connected in a rotationally fixed manner to the shaft, the active connection between a motor output shaft of the motor and the gearwheel to be actuated being designed with drive decoupling means between the motor output shaft and the shaft.

Thus, the actuator of the device for actuating a gearwheel of a transmission device made as a loose wheel is arranged inside the shaft in a space-saving manner, so that compared with conventional transmission devices such a transmission device can be made with smaller structural space dimensions.

Furthermore the embodiment according to the invention of the device as described is characterized by low sealing cost and complexity, since the drive decoupling means between the actuator and the components provided for actuating the gearwheel have been moved away from the parts of the actuator acted upon by pressure medium, to an essentially pressure-free zone. The result is that in a simple manner, the actuation forces for engaging or disengaging a gearwheel are not increased to an undesired extent by friction forces caused by contact seals.

The device according to the invention for actuating a gearwheel of a transmission device made as a loose wheel, is also characterized by small demand for structural space, again because the actuator, preferably in the form of a pneumatic or hydraulic motor connected in a rotationally fixed manner relative to the shaft, is completely accommodated inside the shaft.

In addition, in the same manner as the design of the device according to the invention described above, the design of the device, in which the motor is fixed on the housing or rotationally fixed relative to the shaft, is located, in the area of the active connection between an output shaft of the motor and the gearwheel to be actuated or between the motor output shaft and the shaft, in an unpressurized zone with drive decoupling means, so that compared with systems known from the prior art the sealing complexity is reduced and the gearwheel can be changed from an engaged or disengaged condition to a disengaged or engaged condition by actuation forces as small as possible.

Another alternative and also space-saving embodiment of the device according to the invention for actuating a gearwheel of a transmission device made as a loose wheel, is the device in which an actuator in the form of a piston-cylinder unit is arranged inside the shaft and connected rotationally fixed to it.

In this last-mentioned embodiment of the device according to the invention, in the area of the active connection between a piston rod of the piston-cylinder unit and the gearwheel to be actuated, drive decoupling means are provided between the piston rod and the shaft, so that both the sealing complexity and the actuation forces for engaging or disengaging the gearwheel are as small as possible.

BRIEF DESCRIPTION OF THE DRAWINGS

Other advantages and advantageous further developments of the invention emerge from the claims and the example embodiments whose principle is described with reference to the drawing. For the sake of simplicity, in the description of the various example embodiments the same indexes are used for components having the same structure and function.

The drawing shows.

DETAILED DESCRIPTION OF THE PREFERRED EMBODIMENTS

Figure 1:
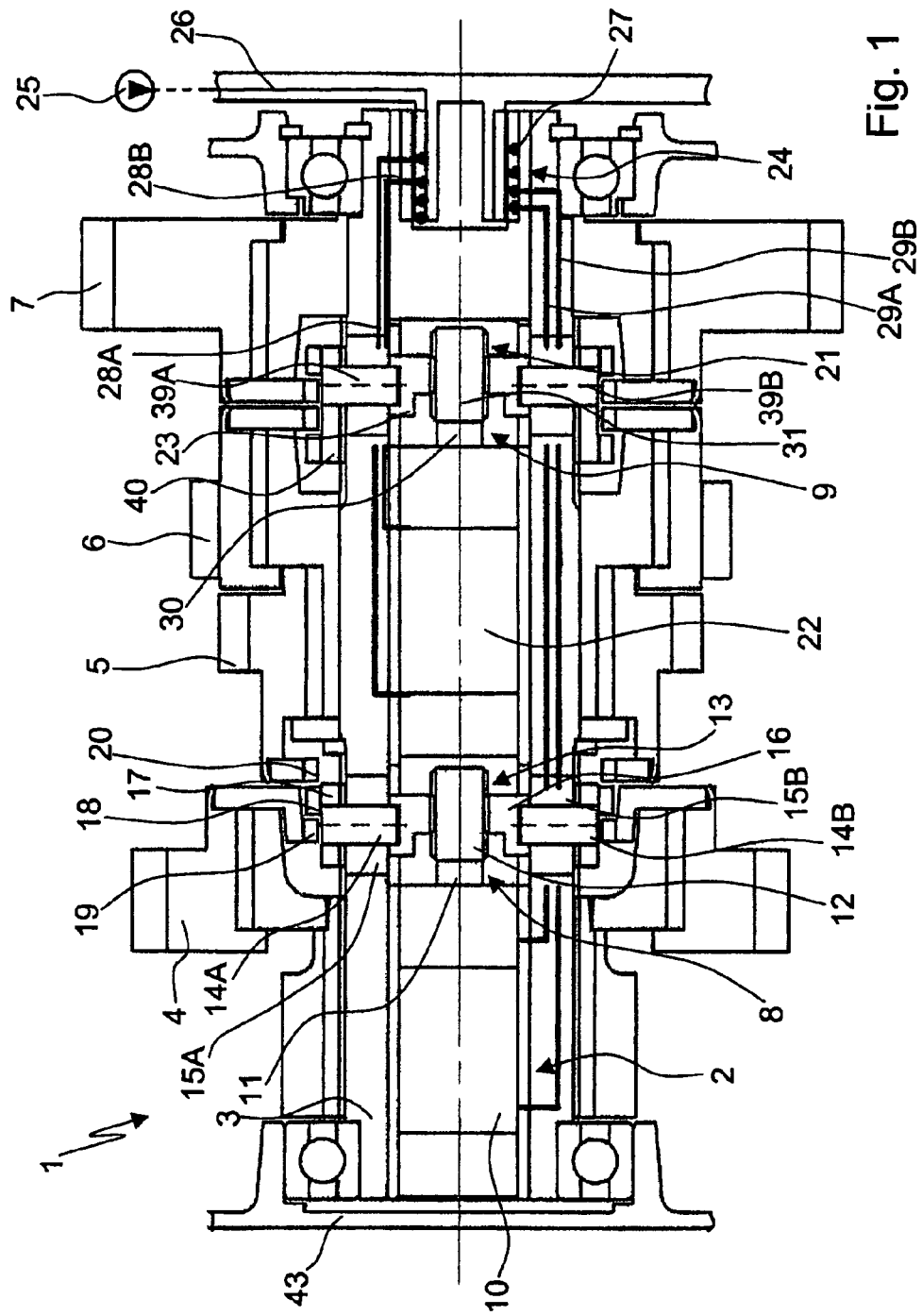
FIG. 1: Schematic partial longitudinally sectioned view of a transmission device comprising a first embodiment of the device according to the invention

FIG. 1 shows a partial longitudinally sectioned view of a transmission device 1 made as a step-down transmission, which comprises a device 2 for rotationally fixing a shaft 3, in the form of a countershaft, with a plurality of gearwheels 4, 5, 6 and 7 made as loose wheels and mounted to rotate on the shaft 3.

The device 2 can also be used in different transmission devices, such as automated shift transmissions, double clutch transmissions or planetary transmissions, for the automated actuation of a transmission device during gearshift operations.

Parallel to the shaft 3 there is a main transmission shaft (not shown), on which are arranged a plurality of gearwheels made as fixed wheels in such manner that each fixed wheel meshes with one of the gearwheels 4 to 7.

The loose wheels 4 and 5 and the loose wheels 6 and 7 can be actuated alternately by means of engaging mechanisms 8 and 9 of the device 2 in such manner that the loose wheels 4 and 5 or 6 and 7 respectively are changed from a condition in which they can rotate on the shaft 3 to a condition in which they are rotationally fixed on the shaft 3, or vice-versa, i.e. from a rotationally fixed condition to a condition in which they can rotate relative to the shaft, in order to be able to transmit a torque applied to the shaft 3, via one of the gearwheels 4 to 7 and a respective fixed wheel meshing with the gearwheels 4 to 7, to the main shaft of the transmission.

The engaging mechanisms 8, 9 of the device 2 have basically the same structure, so that the description below will relate essentially only to the engaging mechanism 8.

The engaging mechanism 8 comprises an actuator 10 which, in the present case, is in the form of a hydraulic swing motor and is connected in a rotationally fixed manner to the shaft 3. During the operation of the transmission device 1 the actuator 10 therefore rotates at the speed of the shaft 3. A motor output shaft 11 of the actuator 10 is connected in a rotationally fixed manner to a spindle 12 of a spindle-nut arrangement 13 of the engaging mechanism 8, so that drive from the actuator rotates the spindle 12 such that a nut 16, which is engaged with the spindle 12 and is connected in a rotationally fixed manner to the shaft 3, moves axially along the shaft 3 away from the actuator 10 or toward it.

In the present case the nut 16 is actively connected with two pins 14A and 14B that pass through the shaft 3, in such manner that the pins 14A and 14B are pushed by the nut 16 along slots 15A, 15B of the shaft 3 in the axial direction of the shaft 3. During the operation of the transmission device 1, the pins 14A and 14B rotate, along with the nut 16 of the spindle-nut arrangement 13, at the speed of the shaft 3 about the rotational axis of the shaft 3.

To connect the gearwheel 4 or the gearwheel 5 in a rotationally fixed manner to the shaft 3 and thus change it from a disengaged to an engaged condition, at their end remote from the nut 16 the pins 14A and 14B are connected with a sleeve element 17 that surrounds the shaft 3, which is connected in a form-locking manner such that it is rotationally fixed relative to the shaft 3 but can move along it in the axial direction of the shaft 3. In addition, the sleeve element 17 is formed in the area of its circumferential surface facing away from the shaft 3 with a toothed profile 18 which, depending on its axial position, engages with a toothed profile 19 which is fixed on the loose wheel 4, a toothed profile 20 which is fixed on the loose wheel 5 or, in a neutral intermediate position between these two toothed profiles 19 and 20, as shown in detail in FIG. 1, with neither of the toothed profiles 19 and 20 so that neither the loose wheel 4 nor the loose wheel 5 is connected in a rotationally fixed manner to the shaft 3.

The spindle-nut arrangement 13 and a spindle-nut arrangement 21 of the engaging mechanism 9 each constitute a drive conversion mechanism by means of which rotary drive of the actuator 10 and that of an actuator 22 of the device 2 also made as an electric motor can be converted to a translational drive movement for engaging or disengaging the loose wheels 4 to 7.

To prevent spontaneous engagement of disengagement of the loose wheels 4 to 7, the spindle-nut arrangements 13 and 21 are in this case of self-locking design, so that the nut 16 of the spindle-nut arrangement 13 and a nut 23 of the spindle-nut arrangement 21 maintain their position unless actuated by the actuator.

Alternatively, in other embodiments of the transmission device not illustrated in the drawing, provision is made for a shift status of a shift element, i.e. in this case the sleeve elements 11 and 40, to be maintained by a retaining torque produced by the actuator by virtue of appropriate control of the actuators of the engaging mechanisms.

To actuate the loose wheels 4 to 7, the actuators 10 and 22 are supplied, via a hydraulic rotary transfer device 24, with the necessary hydraulic pressure from a hydraulic pump 25. The rotary transfer device 24 is in this case connected to the pump 25 by a hydraulic line 26 and in addition comprises control valves 27 which open or block connection lines 28A and 28B or 29A and 29B, respectively between the rotary transfer device 24 and the actuator 10 or the actuator 22, in order to pressurize the actuators 10 and 22 with pressure medium sufficiently for actuation of the loose wheels 4 to 7.

The hydraulic pump, which can be arranged both outside and inside the shaft, can be powered mechanically, electrically, magnetically or hydraulically, depending on the particular application in each case.

By integrating the control valves 27 in the shaft 3 between the pump 25 fewer rotary oil supply connections are needed, so the device 2 can be of simple and inexpensive design.

By virtue of the actuators 10 and 22 made as concomitantly rotating hydraulic motors, which basically deliver a higher power density than electric motors, the device 2 is characterized by a compact and lightweight structure. This makes use of the knowledge that with a hydraulic motor large areas can be provided, upon which the pressure delivered by the pump 25 acts. In addition, owing to the transmission ratio in the spindle, a lower pressure with high volume flow can be used to actuate the motor.

The actuators 10 and 22 made as swing motors in this case retain the central position equivalent to the neutral shift position of the sleeve element 17 shown in FIG. 1, in order to support the self-locking of the spindle-nut arrangement 13 so that spontaneous engagement of the loose wheels 4 and 5 can be reliably prevented.

It is also possible to make the hydraulic swing motors or actuators 10 and 22 such that they retain various positions, so that an engaged loose wheel 4 or 5 can be maintained in the engaged condition without further pressurization by the pump 25.

In the embodiment of the device according to the invention as shown in FIG. 1, drive decoupling between the motor output shaft of the actuator 10 or a motor output shaft 30 of the actuator 22 is provided in each case in the area between the spindle 12 or a spindle 31 of the spindle-nut arrangement 21 and, respectively, the nut 16 or the nut 23, i.e. outside a pressurized zone of the device 2, so that in a simple manner elaborate sealing means of the type known from the prior art are unnecessary.

Figure 2:
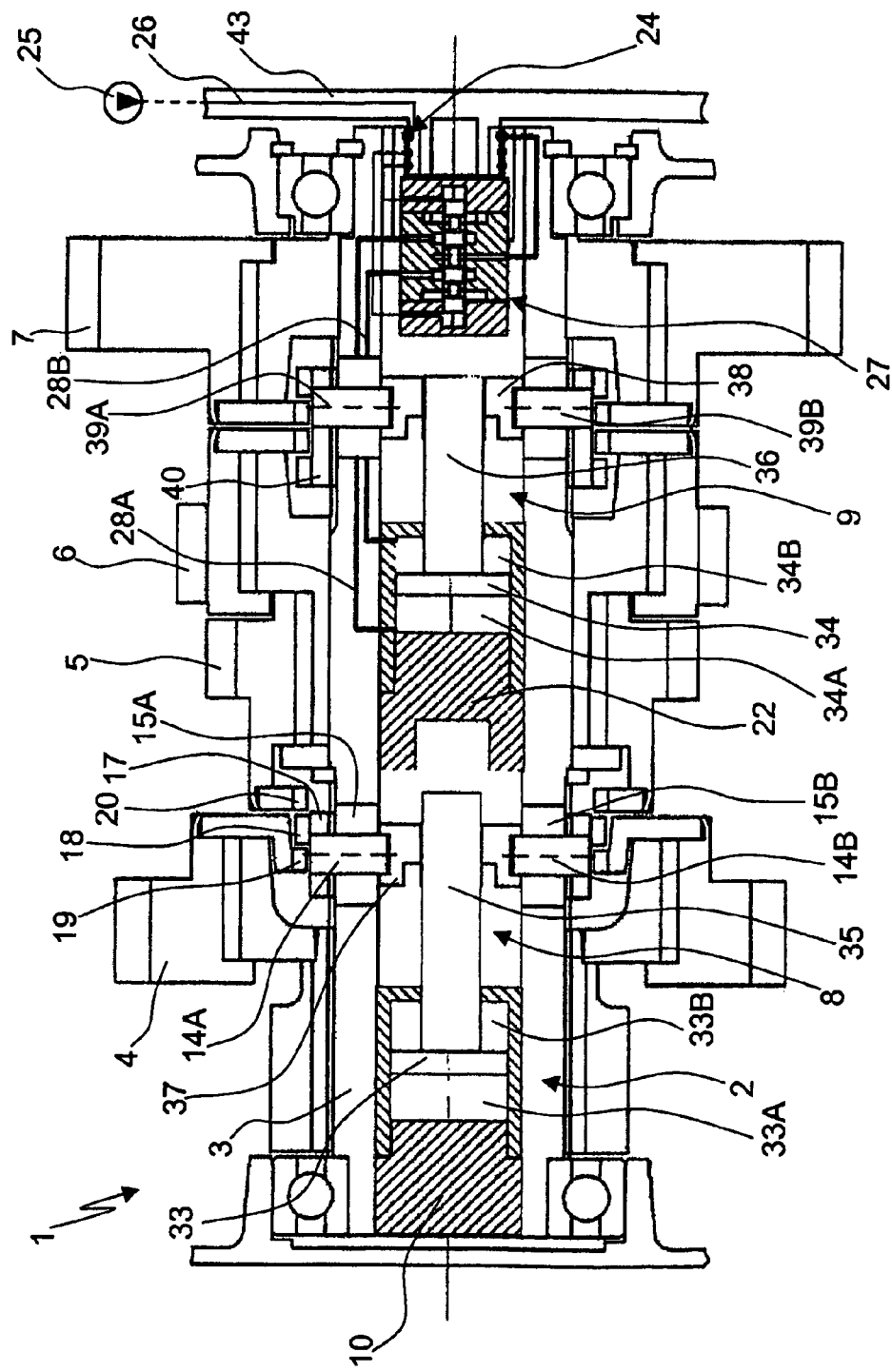
FIG. 2: Representation similar to FIG. 1, of a transmission device comprising a second embodiment of the device according to the invention

FIG. 2 shows another embodiment of the device 2 according to the invention, which differs from the embodiment of the device 2 shown in FIG. 1 both in relation to the actuators 10 and 22 and the engaging mechanisms 8 and 9. In the embodiment of the device 2 shown in FIG. 2 the actuators 10 and 22 are made as piston-cylinder units, which are positioned completely inside the shaft 3 and are connected in a rotationally fixed manner thereto. Pistons 33 and 34 of the actuators 10 and 22 separate piston spaces 33A and 33B or 34A and 34B which are connected respectively to the connection lines 28A, 28B and 29A and 29B, and are fixed to piston rods 35, 36.

The piston rods 35 and 36 are fixed to respective actuation elements 37 and 38, in which the pins 14A, 14B or 39A, 39B of the engaging mechanisms 8 and 9 engage in order to be able to actuate the sleeve element 17 and the sleeve element 40, respectively, in the manner described earlier, along the axial direction of the shaft 3 to engage or disengage the loose wheels 4 to 7.

With regard to the other functions of the device 2 in FIG. 2, reference can be made to the description of the device 2 in FIG. 1, whose functions are essentially the same.

Figure 3:
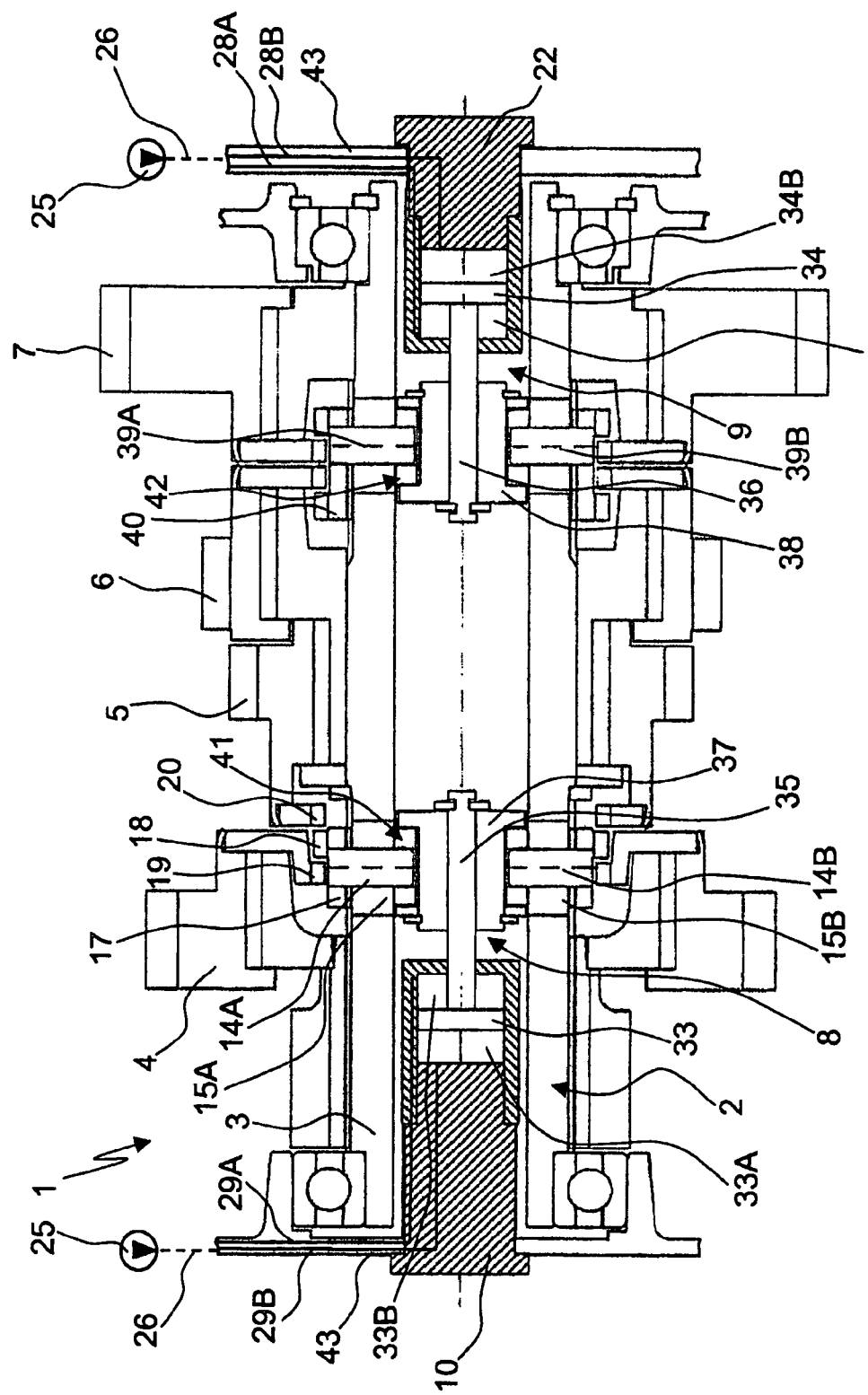
FIG. 3: Representation similar to FIG. 2, in which the transmission device comprising a third embodiment of the device according to the invention.

FIG. 3 shows an embodiment of the device equivalent to that in FIG. 2, in which the actuators 10 and 22 are also made as cylinder-piston units. However, in the embodiment of the device 2 in FIG. 3 the actuators 10 and 22 are rotationally fixed relative to the shaft 3, so that in the area between the actuation elements 37 and 38 and the pins 14A and 14B and the pins 39A and 39B rotation drive decoupling is provided by means, in this case, of bearing devices 41 and 42 made as slide bearings, between the piston rods 35 and 36 of the engaging mechanism 8 and 9, also rotationally fixed relative to the shaft 3, and the pins 14A, 14B, and 39A, 39B respectively.

Alternatively, the bearing devices can also consist of roller bearings, to enable relative movement, as functionless as, possible between the pins rotating at the speed of the shaft 3 when the transmission device is operating, and the actuation elements of the engaging mechanisms of the device 2.

Starting from the ends of the shaft 3, the actuators 10 and 22 inside the shaft 3 are each connected in a rotationally fixed manner to a housing 43 of the transmission device 1, so that the connections to the hydraulic pump 25 are provided without the rotary transfer device 24 shown in FIGS. 1 and 2, through the housing 43 of the transmission device 1 and directly to the piston spaces 33A, 33B and 34A, 34B in a simple manner. Control valves (not shown in FIG. 3) for pressurizing of the piston spaces 33A to 34B as necessary can be arranged inside the shaft 3 or outside the shaft, depending on the particular application.

To increase the rigidity of the actuators, in a further development of the embodiment of the device according to the invention shown in FIG. 3 (the further development not being shown), the actuators can be mounted in the shaft by suitable bearings at their ends engaged in the inside of the shaft, and/or the actuators can be made as hydraulic motors.

In the last-mentioned embodiment the rotary drive of the hydraulic motors has to be converted, for example by spindle-nut arrangements as illustrated in FIG. 1, into translational actuation movements for the engagement or disengagement of loose wheels arranged on the shaft.

Figure 4:
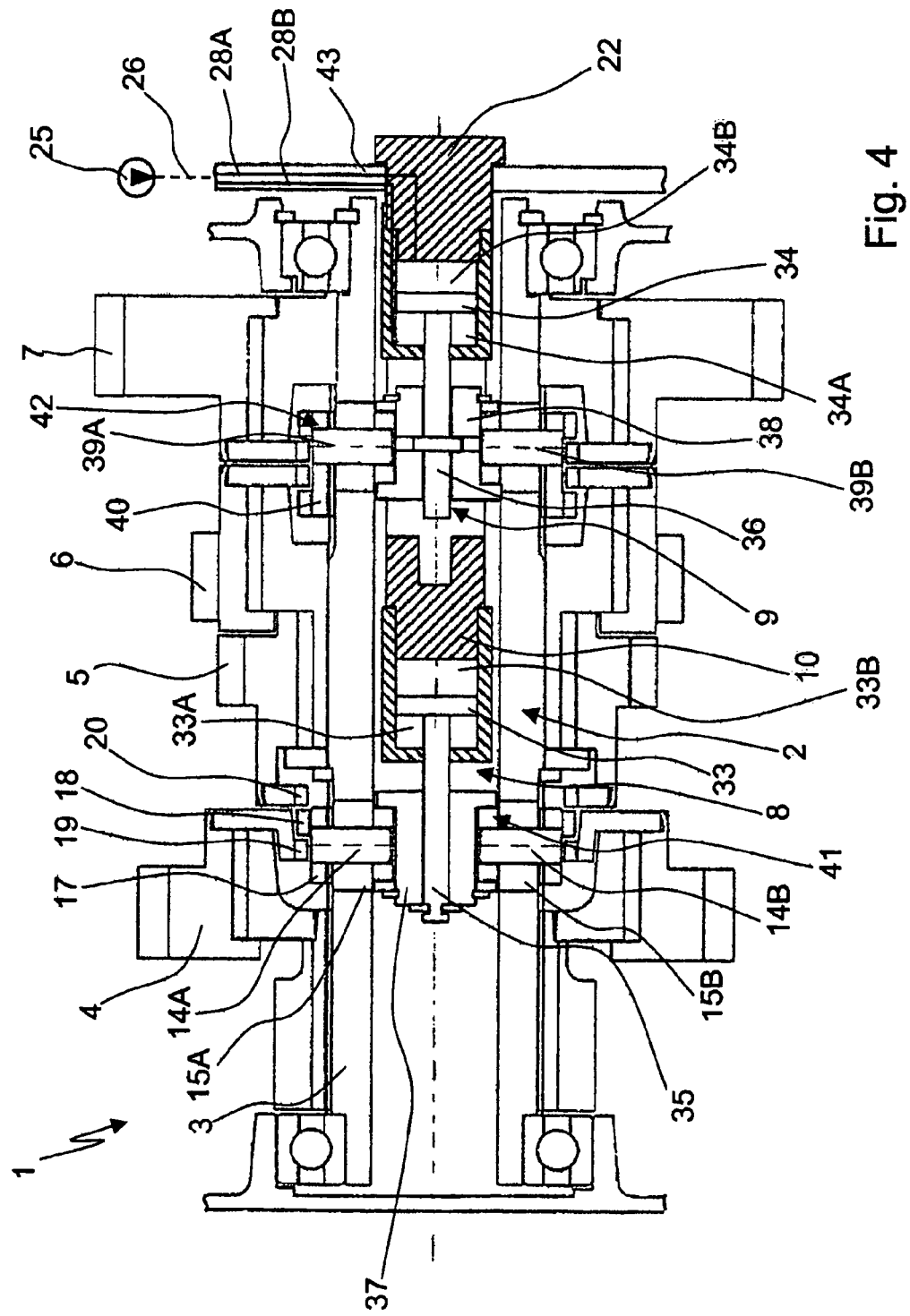
FIG. 4: Representation similar to FIG. 2, of a transmission device comprising a fourth embodiment of the device according to the invention

In the fourth embodiment of the device 2 according to the invention, shown in FIG. 4, which differs from the embodiment shown in FIG. 3 only in the arrangement of the actuators 10 and 22, the two actuators 10 and 22 are connected in the area of their housing so that connection to the transmission housing 43 is needed on only one side. Both actuators 10 and 22 are also supplied with pressure oil from the pump 25 via that side of the transmission housing 43 to which they are connected rotationally fixed, the connection lines to the actuator 10 in this case lying outside the section plane shown and for that reason not being visible in FIG. 4.

To transmit the translational actuation movement of the actuator 10 from inside the shaft 3 to the outside, the connection between the actuators 10 and 22 comprises a so-termed free passage through which the actuation element of the engaging mechanism 8, in which the drive decoupling is integrated, can be connected to the pins 14A and 14B.

This design makes it possible to arrange even more than two actuators connected to one another inside the shaft 3, and thus to actuate more than four loose wheels arranged on a countershaft or suchlike.

Fundamentally, the device according to the invention is characterized by a compact and light structure that takes up little structural space. Furthermore, loose wheels arranged on a transmission shaft can be changed from an engaged to a disengaged operating condition or from a disengaged to an engaged one with low friction losses, so that to control the actuators the hydraulic fluid of a hydraulic system of the transmission device or a hydraulic fluid of a separate oil circuit can be used.

Moreover, the actuators can also be in the form of pneumatic motors or operating control cylinders and the control valves provided for the control and/or regulation of the actuators can be mechanical, electric, magnetic or hydraulic valve devices.

Particularly in the case of the design in which the actuators are fixed on the housing, the device according to the invention can in a simple manner be made with a leakproof, separate and efficiency-optimized high pressure hydraulic system for actuating loose wheels arranged on the shaft, since no rotary oil transfer device is needed.

In a further advantageous embodiment of the device according to the invention (not shown in the drawing), the device is made with only one actuator for applying the actuation force for engaging or disengaging several gearwheels arranged to rotate on a shaft, a so-termed selection actuator being associated with the actuator. By means of the selection actuator a choice can be made between the various loose wheels of the transmission device to be actuated, so that the gearwheel chosen by the selection actuator, or the shift element associated with it, is acted upon by the actuation force produced by the actuator, while the other gearwheels are not actuated by the actuator.

In this case the selection actuator can preferably be made as a shift magnet, a hydraulically actuated clutch, or suchlike, which produces a respective connection between the actuator of the device pressurized with a fluidic pressure medium and the loose wheel to be actuated by the device, as necessary for actuating the loose wheel or the shift element associated with it.

| Indexes | |
|---|---|
| 1 | Transmission device |
| 2 | Device |
| 3 | Shaft |
| 4 to 7 | Gearwheel |
| 8, 9 | Engaging mechanism |
| 10 | Actuator |
| 11 | Motor output shaft |
| 12 | Spindle |
| 13 | Spindle-nut arrangement |
| 14A, B | Pins |
| 15A, B | Slots |
| 16 | Nut |
| 17 | Sleeve element |
| 18 to 20 | Toothed profile |
| 21 | Spindle-nut arrangement |
| 22 | Actuator |
| 23 | Nut |
| 24 | Rotary transfer device |
| 25 | Pump |
| 26 | Hydraulic line |
| 27 | Control valve |
| 28A, B | Connection line |
| 29A, B | Connection line |
| 30 | Motor output shaft |
| 31 | Spindle |
| 33 | Piston |
| 33A, B | Piston space |
| 34 | Piston |
| 34A, B | Piston space |
| 35, 36 | Piston rod |
| 37, 38 | Actuation element |
| 39A, B | Pins |
| 40 | Sleeve element |
| 41, 42 | Bearing device |
| 43 | Housing |

The invention claimed is:

1. A device (2) for actuating a loose gearwheel (4 to 7) of a transmission device (1), the device (2) comprising:
   at least one engagement mechanism (8, 9) for shifting the gearwheel (4 to 7) between a state in which the gearwheel (4 to 7) is engaged with a shaft (3), and a state in which the gearwheel (4 to 7) is rotatable with respect to the shaft (3),
   the at least one engagement mechanism (8, 9) comprising at least one actuator (10, 22) arranged at least partially inside the shaft (3) and actuated by a pressure medium for engaging the gearwheel (4 to 7) with the shaft (3),
   an actuation force from the at least one actuator (10, 22) being exerted on the gearwheel (4 to 7), from inside of the shaft (3) outwardly, to either engage the gearwheel (4 to 7) with the shaft (3) or to disengage the gearwheel (4 to 7) from the shaft (3),
   the at least one actuator (10, 22) being a piston-cylinder unit accommodated inside the shaft (3) and rotationally fixed within the shaft (3); and
   a pump, which pressurizes the pressure medium, being arranged inside the shaft.

2. The device according to claim 1, wherein the engagement mechanism is a module comprising a plurality of combined actuators.

3. The device according to claim 1, wherein a valve device (27), for pressurizing the actuator (10, 22) with the pressure medium, is rotationally fixed to the shaft (3).

4. The device according to claim 1, wherein a part of the actuator (10, 22), which is located inside the shaft (3), includes an oil duct for supplying hydraulic fluid.

5. The device according to claim 1, wherein a plurality of gearwheels are shifted by the actuator, and respective active connections between the actuator and the gearwheels are engaged and disengaged by a selection actuator.

6. The device according to claim 5, wherein the selection actuator is mounted inside the shaft.

7. A device (2) for actuating a loose gearwheel (4 to 7) of a transmission device (1), the device (2) comprising:
- at least one engagement mechanism (8, 9) for shifting the gearwheel (4 to 7) between a state in which the gearwheel (4 to 7) is engaged with a shaft (3), and a state in which the gearwheel (4 to 7) is disengaged from and rotatable with respect to the shaft (3),
- the at least one engagement mechanism (8, 9) comprising at least one actuator (10, 22) arranged at least partially inside the shaft (3) and actuated by a pressure medium for rotationally engaging the gearwheel (4 to 7) to the shaft (3),
- an actuation force from the at least one actuator (10, 22) being exerted on the gearwheel (4 to 7) from inside of the shaft (3) outwardly to either rotationally engage the gearwheel (4 to 7) to the shaft (3) or rotationally disengage the gearwheel (4 to 7) from the shaft (3),
- the at least one actuator (10, 22) being a motor that is rotationally fixed to the shaft (3) and accommodated inside the shaft (3), and
- an active connection between an output shaft (11, 30) of the motor and the gearwheel (4 to 7) to be actuated being achieved by a rotational drive decoupling means between the output shaft (11, 30) and the shaft (3).

8. The device according to claim 7, wherein the motor (10, 22) is one of a hydraulic motor and a pneumatic motor.

9. The device according to claim 7, wherein the engagement mechanism (8, 9) comprises a drive converter device (13, 21) located between the actuator (10, 22) and the gearwheel (4 to 7) such that rotary drive from the actuator (10, 22) is converted to translational drive movement.

10. The device according to claim 9, wherein the drive converter device comprises a spindle-nut arrangement (13, 21).

11. The device according to claim 9, wherein a planetary transmission is arranged between the actuator and the drive converter device.

12. The device according to claim 7, wherein the motor is a swing motor which maintains a swing position equivalent to an operating condition of the gearwheel (4 to 7) in which the gearwheel (4 to 7) rotates relative to the shaft (3).

13. The device according to claim 12, wherein the swing motor maintains a position corresponding to a plurality of operating conditions of the gearwheel.

14. A device (2) for actuating a loose gearwheel (4 to 7) of a transmission device (1), the device (2) comprising:
- at least one engagement mechanism (8, 9) which shifts the gearwheel (4 to 7) between a state in which the gearwheel (4 to 7) is engaged with a shaft (3) and a state in which the gearwheel (4 to 7) is disengage from and rotatable with respect to the shaft (3),
- the at least one engagement mechanism (8, 9) comprises at least one actuator (10, 22) which is arranged completely inside the shaft (3) and which is actuated by a pressure medium to rotationally engage the gearwheel (4 to 7) to the shaft (3),
- an actuation force from the at least one actuator (10, 22) is exerted on the gearwheel (4 to 7) from inside of the shaft (3) outwardly to either rotationally engage the gearwheel (4 to 7) to the shaft (3) or rotationally disengage the gearwheel (4 to 7) from the shaft (3),
- the at least one actuator (10, 22) is a motor that is rotationally fixed relative to the shaft (3) and is accommodated completely inside the shaft (3), and
- an active connection between a motor output shaft of the motor and the gearwheel to be actuated is made with rotational drive decoupling mechanism located between the motor output shaft and the shaft.

15. A device (2) for actuating a loose gearwheel (4 to 7) of a transmission device (1), the device (2) comprising:
- at least one engagement mechanism (8, 9) for shifting the gearwheel (4 to 7) between a state in which the gearwheel (4 to 7) is rotationally engaged to a shaft (3), and a state in which the gearwheel (4 to 7) is rotationally disengaged from the shaft (3),
- the at least one engagement mechanism (8, 9) comprising at least one actuator (10, 22) being arranged at least partially inside the shaft (3) and actuated by a pressure medium for engaging the gearwheel (4 to 7) with the shaft (3),
- an actuation force from the at least one actuator (10, 22) being exerted on the gearwheel (4 to 7) from inside of the shaft (3) outwardly for either engaging the gearwheel (4 to 7) with the shaft (3) or disengaging the gearwheel (4 to 7) from the shaft (3),
- the at least one actuator (10, 22) being a piston-cylinder unit accommodated inside the shaft (3) and being rotationally fixed relative to the shaft (3),
- an active connection between a piston rod (35, 36) of the piston-cylinder unit (10, 22) and the gearwheel (4 to 7) to be actuated being achieved by rotational drive decoupling means between the piston rod (35, 36) and the shaft (3); and
- the drive decoupling means being one of a slide bearing device and a roller bearing device.

16. The device according to claim 15, wherein a valve device, for pressurizing the actuator (10, 22) with the pressure medium, is rotationally fixed relative to the shaft (3).

* * * * *